(12) United States Patent
Piesker

(10) Patent No.: US 8,959,937 B2
(45) Date of Patent: Feb. 24, 2015

(54) METHOD FOR OPERATING A COOLING SYSTEM

(75) Inventor: Markus Piesker, Lueneburg (DE)

(73) Assignee: Airbus Operations GmbH, Hamburg (DE)

( * ) Notice: Subject to any disclaimer, the term of this patent is extended or adjusted under 35 U.S.C. 154(b) by 418 days.

(21) Appl. No.: 13/428,035

(22) Filed: Mar. 23, 2012

(65) Prior Publication Data

US 2013/0074532 A1 Mar. 28, 2013

Related U.S. Application Data

(60) Provisional application No. 61/466,976, filed on Mar. 24, 2011.

(30) Foreign Application Priority Data

Mar. 24, 2011 (DE) .......................... 10 2011 014 944

(51) Int. Cl.
| | |
|---|---|
| F25D 15/00 | (2006.01) |
| F25B 23/00 | (2006.01) |
| F25B 39/02 | (2006.01) |
| F25B 39/04 | (2006.01) |
| F28D 15/00 | (2006.01) |
| B64D 13/06 | (2006.01) |

(52) U.S. Cl.
CPC ............... *F25B 39/02* (2013.01); *F25B 23/006* (2013.01); *F25B 39/04* (2013.01); *B64D 2013/0629* (2013.01); *Y10S 62/05* (2013.01)
USPC ..................... 62/119; 165/104.11; 62/DIG. 5; 62/118; 62/394

(58) Field of Classification Search
CPC ..................... B64D 2013/0629; F25B 23/006; F25B 41/003; F25B 41/00; F25B 45/00; F25B 2345/002; F25B 2345/001; F25B 39/02; F25B 39/04; F28D 2021/0021
USPC ............. 62/174, 149, 503, 509, 292, 77, 119, 62/79, 118, 394, DIG. 5, DIG. 22, 185, 62/201, 512, 175, 113, 99; 165/104.22, 165/104.21, 104.11
See application file for complete search history.

(56) References Cited

U.S. PATENT DOCUMENTS

| | | | | |
|---|---|---|---|---|
| 4,913,714 A | * | 4/1990 | Ogura et al. .................... | 62/149 |
| 4,986,082 A | * | 1/1991 | Tomaru .......................... | 62/149 |
| 2009/0000329 A1 | * | 1/2009 | Colberg et al. ................. | 62/335 |
| 2010/0251737 A1 | * | 10/2010 | Roering ......................... | 62/115 |

FOREIGN PATENT DOCUMENTS

| | | |
|---|---|---|
| DE | 698 17 151 T1 | 6/2004 |
| DE | 10 2006 005 035 B3 | 9/2007 |
| DE | 10 2009 011 797 A1 | 9/2010 |
| WO | 2005/038362 A1 | 4/2005 |

* cited by examiner

*Primary Examiner* — Tho V Duong
*Assistant Examiner* — Aaron Isenstadt
(74) *Attorney, Agent, or Firm* — Carter, DeLuca, Farrell & Schmidt, LLP

(57) ABSTRACT

In a method for operating a cooling system for cooling food on board an aircraft, a partial amount of refrigerant, which, in the rest state, is stored in a receiving space of a refrigerant container in the gaseous state of aggregation, is discharged from the receiving space of the refrigerant container into a cooling circuit of the cooling system. The partial amount of the refrigerant is directed into a liquefier arranged in the cooling circuit and converted to the liquid state of aggregation. The partial amount of the refrigerant liquefied by the liquefier is directed through a heat exchanger arranged in the receiving space of the refrigerant container. The remaining refrigerant, stored in the receiving space of the refrigerant container in the gaseous state of aggregation, is converted to the liquid state of aggregation by heat energy transfer to the partial amount of the refrigerant flowing through the heat exchanger.

17 Claims, 4 Drawing Sheets

METHOD FOR OPERATING A COOLING SYSTEM

TECHNICAL FIELD

The invention relates to a method for operating a cooling system which is designed for operation with a two-phase refrigerant and is suitable in particular for cooling food on board an aircraft.

BACKGROUND OF RELATED ART

Cooling systems suitable for operation with a two-phase refrigerant are known from DE 10 2006 005 035 B3 and DE 10 2009 011 797 A1 and are used for example to cool food which is stored on board a passenger aircraft and intended to be distributed to the passengers. Typically, the food intended for supplying to the passengers is kept in mobile transport containers. These transport containers are filled and pre-cooled outside the aircraft and after loading into the aircraft are placed at appropriate locations in the aircraft passenger cabin, for example in the galleys. In order to guarantee that the food remains fresh up to being distributed to the passengers, in the region of the transport container locations cooling stations are provided, which are supplied with cooling energy from a central refrigerating device and release this cooling energy to the transport containers, in which the food is stored.

A cooling system with a central refrigerating device, as opposed to refrigerating units formed separately at the individual transport container locations, has the advantages of a smaller installation volume and a lower weight and moreover entails less outlay for assembly and maintenance. Furthermore, by using a cooling system with a central refrigerating device arranged outside the passenger cabin it is possible to avoid machine noises generated by refrigerating units placed in the region of the transport container locations, which noises are audible in the aircraft passenger cabin and hence may be found to be disturbing.

In the cooling systems known from DE 10 2006 005 035 B3 and DE 10 2009 011 797 A1, the phase transitions of the refrigerant flowing through the cooling circuit of the cooling systems which occur during operation of the system allow the latent heat consumption which then occurs to be utilised for cooling purposes. The refrigerant mass flow needed to provide a desired cooling capacity is therefore markedly lower than for example in a liquid cooling system, in which a one-phase liquid refrigerant is used. Consequently, the cooling systems described in DE 10 2006 005 035 B3 and DE 10 2009 011 797 A1 may have lower line cross sections than a liquid cooling system with a comparable cooling capacity. What is more, the reduction of the refrigerant mass flow makes it possible to reduce the conveying capacity needed to convey the refrigerant through the cooling circuit of the cooling system. This leads to an increased efficiency of the system because less energy is needed to operate a corresponding conveying device, such as for example a pump, and moreover less additional heat generated by the conveying device during operation of the conveying device has to be removed from the cooling system.

In the cooling systems known from the prior art, there is the problem that it is frequently difficult to accommodate the system components in the very limited installation space available on board an aircraft or even position them relative to one another such that, for example, efficiency-optimised operation of the cooling system is made possible by utilising gravity in the process management.

SUMMARY

The underlying object of the invention is to provide a method for operating a cooling system which is designed for operation with a two-phase refrigerant and enables a volume- and weight-optimised design of the cooling system.

This object is achieved by a method for operating a cooling system which is designed for operation with a two-phase refrigerant, having the features of Claim 1.

In a method according to the invention for operating a cooling system which is suitable, in particular, for cooling food on board an aircraft, on starting the cooling system a partial amount of a refrigerant, which, in the rest state of the cooling system, is stored in a receiving space of a refrigerant container in the gaseous state of aggregation, is discharged from the receiving space of the refrigerant container into a cooling circuit of the cooling system. Preferably, in the rest state of the cooling system, substantially the total amount of refrigerant circulating in the cooling circuit during normal operation of the cooling system is stored in the receiving space of the refrigerant container. The refrigerant is a two-phase refrigerant which can be converted from the liquid to the gaseous state of aggregation on releasing its cooling energy to a device to be cooled and subsequently be converted back to the liquid state of aggregation again by appropriate pressure and temperature control. For example, $CO_2$ or R134A ($CH_2F$—$CF_3$) may be used as the refrigerant. The temperature of the refrigerant in the receiving space of the refrigerant container is dependent, in the rest state of the cooling system, on the ambient temperature, so that the refrigerant in the receiving space of the refrigerant container may be, in principle, in the liquid state, in the gaseous state or in a supercritical state depending on the ambient conditions.

The partial amount of the refrigerant discharged from the receiving space of the refrigerant container is directed into a liquefier arranged in the cooling circuit and converted to the liquid state of aggregation. The liquefier may comprise, for example, a heat exchanger which is arranged in its interior space and through which a further refrigerant flows. The further refrigerant may be cooled to a desired low temperature, for example, by a separately formed refrigerating device before being supplied into the liquefier. A liquid refrigerant, but also a two-phase refrigerant, in particular $CO_2$ or R134A, may be used as the further refrigerant. By heat transfer to the further refrigerant flowing through the heat exchanger of the liquefier, it is possible to convert refrigerant supplied into the liquefier and held in an interior space of the liquefier from the gaseous state of aggregation to the liquid state of aggregation.

The partial amount of the refrigerant liquefied by the liquefier is directed through a heat exchanger arranged in the receiving space of the refrigerant container. The heat exchanger may comprise, for example, a spirally or conically wound pipe coil and be provided with lamellae arranged in the region of its outer surfaces. Furthermore, a coaxial configuration of the heat exchanger is conceivable. By heat energy transfer to the partial amount of refrigerant flowing through the heat exchanger, the remaining refrigerant stored in the receiving space of the refrigerant container in the gaseous state of aggregation is converted to the liquid state of aggregation. In the operating method according to the invention, consequently the partial amount of the refrigerant liquefied in the liquefier is utilised to convert the remaining refrigerant, stored in the receiving space of the refrigerant container iii the gaseous state of aggregation, to the liquid state of aggregation.

As a result, the cooling system manages without a separate cooling circuit for liquefying the refrigerant stored in the receiving space of the refrigerant container in the gaseous state of aggregation and without a cascade connection of cooling circuits. The operating method according to the invention thus enables a volume- and weight-optimised design of a cooling system operated by the method according to the invention.

Preferably, the partial amount of the refrigerant discharged from the receiving space of the refrigerant container into the cooling circuit is discharged from the receiving space of the refrigerant container into the cooling circuit in a manner driven by differential pressure. If the receiving space of the refrigerant container filled with the refrigerant in the gaseous state of aggregation is under a higher pressure than the cooling circuit, it is possible to dispense with the use of a conveying device for conveying the partial amount of the refrigerant from the receiving space of the refrigerant container into the cooling circuit. On flowing through the cooling circuit and/or further components of the cooling system, the partial amount of the refrigerant discharged from the receiving space of the refrigerant container into the cooling circuit preferably expands and thereby ensures cooling of the cooling circuit and/or further components of the cooling system. As a result, at a later operating time when liquid refrigerant flows through the cooling circuit and/or the further components of the cooling system, it is possible to effectively prevent the liquid refrigerant from evaporating owing to the heat released by the pipelines of the cooling circuit and/or the further components of the cooling system and thereby resulting in how separations.

The partial amount of the refrigerant discharged from the receiving space of the refrigerant container into the cooling circuit of the cooling system may be controlled in dependence on the pressure of the refrigerant in the cooling circuit and/or further components of the cooling system. Furthermore, on the control of the partial amount of the refrigerant discharged from the receiving space of the refrigerant container into the cooling circuit of the cooling system, preferably the maximum pressure loadability of the cooling circuit and/or further components of the cooling system is taken into account. In particular, the low the pressure of the refrigerant in the cooling circuit and/or the further components of the cooling system and/or the higher the pressure loadability for which the cooling circuit and/or the further components of the cooling system are designed, the greater the partial amount of the refrigerant discharged from the receiving space of the refrigerant container into the cooling circuit of the cooling system can be. Such a process management enables the refrigerant stored in the receiving space of the refrigerant container in the gaseous state of aggregation to be liquefied as quickly as possible, without loading the cooling circuit and/or the further components of the cooling system too heavily.

Before the partial amount of the refrigerant in the gaseous state of aggregation is discharged from the receiving space of the refrigerant container into the cooling circuit, refrigerant, which, in the rest state of the cooling system, is stored in the cooling circuit and/or further components, in particular a reservoir, of the cooling system in the gaseous state of aggregation, may be directed into the liquefier and converted to the liquid state of aggregation. As a result, the pressure in the cooling circuit and/or the further components of the cooling system falls. Consequently, immediately afterwards the partial amount of the refrigerant in the gaseous state of aggregation can be directed out of the receiving space of the refrigerant container into the cooling circuit, without excessively loading the system.

The refrigerant liquefied by the liquefier, that is to say the partial amount, converted into the liquid state of aggregation by the liquefier, of the refrigerant stored, in the rest state of the cooling system, in a receiving space of a refrigerant container in the gaseous state of aggregation, and/or the refrigerant stored, in the rest state of the cooling system, in the cooling circuit and/or further components of the cooling system in the gaseous state of aggregation, may be supplied after its liquefaction to a reservoir. Preferably, the refrigerant is supercooled before being supplied into the reservoir or in the reservoir. This may be achieved by at least partially flooding the liquefier with the liquid refrigerant to be directed off into the reservoir, so that heat energy stored in the liquid refrigerant can be transferred to the further refrigerant flowing through the heat exchanger of the liquefier. Alternatively or additionally to this, the reservoir may also be connected via a recirculation line to the liquefier, so that refrigerant can be recirculated from the reservoir into the liquefier and supercooled there. Finally, it is conceivable to supply cold energy from an external refrigerating device to the reservoir for the supercooling of the refrigerant stored in the reservoir.

The refrigerant, which, in the rest state of the cooling system, is stored in the cooling circuit and/or further components of the cooling system in the gaseous state of aggregation and after its liquefaction in the liquefier is temporarily stored in the storage reservoir, may be directed in the direction of a conveying device arranged downstream of the storage reservoir in the cooling circuit by a pressure rise in the cooling circuit and/or the storage reservoir caused by discharging the partial amount of the refrigerant in the gaseous state of aggregation from the receiving space of the refrigerant container into the cooling circuit and/or by a pressure increase in the cooling system. Preferably, the conveying device is configured as a pump suitable for conveying the refrigerant in its liquid phase. Compared with a compressor suitable for conveying gaseous refrigerant, a pump offers the advantage of a having a small size, a low energy consumption and a lower weight.

Owing to the pressure-driven supply of liquid refrigerant in the direction of the pump, the volume of any refrigerant gas still present in a pipeline upstream of the conveying device is reduced. Ideally, the conveying device is even completely flooded. This prevents gaseous refrigerant or refrigerant present as wet steam from having to be conveyed by the conveying device suitable for conveying liquid refrigerant, and thereby resulting in flow separations or even damage of the conveying device. If necessary, in this operating phase of the cooling system, further regions of the cooling circuit or further components of the cooling system may be opened by appropriate control of appropriate valves for the supply of gaseous refrigerant from the receiving space of the refrigerant container, in order to control the pressure in the cooling circuit and/or the further components of the cooling system as desired.

The refrigerant directed through the heat exchanger arranged in the receiving space of the refrigerant container may be converted, on flowing through the heat exchanger, by cooling energy transfer to the remaining refrigerant stored in the receiving space of the refrigerant container in the gaseous state of aggregation, to the gaseous state of aggregation again and after flowing through the heat exchanger may be supplied to the liquefier again. Besides the partial amount of the refrigerant discharged from the receiving space of the refrigerant container into the cooling circuit and liquefied by the liquefier, it is also possible to supply to the heat exchanger arranged in the receiving space of the refrigerant container the refrigerant which, in the rest state of the cooling system, is stored in the cooling circuit and/or further components of the cooling system in the gaseous state of aggregation and after its liquefaction is temporarily stored in the storage reservoir. Of course, this refrigerant, too, on flowing through the heat exchanger arranged in the receiving space of the refrigerant container may be converted, by cooling energy transfer to the remaining refrigerant stored in the receiving space of the refrigerant container in the gaseous state of aggregation, to the gaseous state of aggregation again and after flowing through the heat exchanger may be supplied to the liquefier again.

Preferably, the entire refrigerant flowing through the heat exchanger arranged in the receiving space of the refrigerant container is converted, on the cooling energy transfer to the remaining refrigerant stored in the receiving space of the refrigerant container in the gaseous state of aggregation, into the gaseous state of aggregation again. As a result, the entire enthalpy difference between dew-point curve and bubble-point curve can be utilised for liquefying the refrigerant stored in the receiving space of the refrigerant container in the gaseous state of aggregation.

The pressure in the cooling circuit and/or further components of the cooling system may be controlled by appropriately controlling a refrigerant volume flow to the heat exchanger arranged in the receiving space of the refrigerant container. A pressure reduction is possible by a throttling of the refrigerant volume flow to the heat exchanger arranged in the receiving space of the refrigerant container. Conversely, the pressure may be increased by increasing the refrigerant volume flow to the heat exchanger arranged in the receiving space of the refrigerant container. The control of the refrigerant volume flow can be realised by an appropriate control of the conveying device or an appropriate valve control.

Alternatively or additionally to this, the pressure in the cooling circuit and/or further components of the cooling system may be controlled by increasing the liquefaction capacity of the liquefier for liquefying the refrigerant converted to the gaseous state of aggregation again on flowing through the heat exchanger arranged in the receiving space of the refrigerant container. An increase of the liquefaction capacity of the liquefier may be achieved by reducing a refrigerant filling level in the liquefier and the liquefier consequently providing less supercooling capacity and instead more liquefaction capacity. Furthermore, by an appropriate operation control of a liquefier comprising a plurality of liquefier units, an increase of the liquefaction capacity can be realised.

After the conversion of the refrigerant, stored, in the rest state of the cooling system, in the receiving space of the refrigerant container, in the cooling circuit and/or further components of the cooling system in the gaseous state of aggregation, to the liquid state of aggregation, the refrigerant in the liquid state of aggregation may be circulated through the heat exchanger arranged in the receiving space of the refrigerant container, the receiving space of the refrigerant container and the liquefier for supercooling. In other words, the liquid refrigerant may be directed into the receiving space of the refrigerant container after flowing through the heat exchanger arranged in the receiving space of the refrigerant container. The refrigerant may then recirculated from the receiving space of the refrigerant container into the liquefier before the refrigerant is once again supplied to the heat exchanger arranged in the receiving space of the refrigerant container. In this operating state, a storage reservoir arranged in the cooling circuit of the cooling system is preferably completely emptied, i.e. the entire refrigerant present in the cooling system is included in the supercooling circuit to ensure a uniform supercooling of the refrigerant.

Refrigerant in the liquid state of aggregation during normal operation of the cooling system is supplied to at least one cooling station, the refrigerant being converted at least partially from the liquid to the gaseous state of aggregation on releasing its cooling energy to the at least one cooling station. In principle, the cooling stations operable as evaporators may be operated with dry evaporation or flooded evaporation. In the case of the dry evaporation, the refrigerant supplied to the cooling stations in the liquid state of aggregation is completely evaporated and superheated. In the process, the latent heat of the refrigerant is completely utilised, so that a particularly intense and efficient cooling of the cooling stations is possible. The conveying mass flow of the refrigerant transported to the cooling stations can thus be reduced. As a result, a small total amount of refrigerant is needed. Furthermore, the pipelines of the cooling circuit can be dimensioned with small diameters. In the case of the flooded evaporation, by contrast, such a large conveying mass flow of refrigerant is supplied to the cooling stations that the evaporation capacity of the cooling stations is not sufficient to evaporate the entire conveying mass flow of liquid refrigerant supplied to the cooling stations. By operating the cooling stations with flooded evaporation, it is possible to ensure that peaks in the cooling capacity requirement of the cooling stations can be reliably met.

The refrigerant converted at least partially to the gaseous state of aggregation on releasing its cooling energy to the at least one cooling station may be directed into the receiving space of the refrigerant container, in order to be converted to the liquid state of aggregation again by heat energy transfer to the refrigerant flowing through the heat exchanger arranged in the receiving space of the refrigerant container. During normal operation of the cooling system, the refrigerant container can thus be operated as a liquefier for liquefying the refrigerant converted to the gaseous state of aggregation in the cooling stations. Alternatively or additionally to this, the refrigerant, which is at least partially converted to the gaseous state of aggregation on releasing its cooling energy to the at least one cooling station, may also be directed into the liquefier in order to be converted to the liquid state of aggregation again by heat energy transfer to a refrigerant flowing through a heat exchanger of the liquefier. If the refrigerant held in the receiving space of the refrigerant container has a lower temperature than the further refrigerant flowing through the heat exchanger, the refrigerant container can also be operated as a cold reservoir and cooling energy can be transferred from refrigerant held in the receiving space of the refrigerant container to the further refrigerant flowing through the heat exchanger.

If desired, the refrigerant may also be supercooled in the receiving space of the refrigerant container and/or the liquefier. This can be achieved by at least partially flooding the receiving space of the refrigerant container and/or the liquefier with the liquefied refrigerant. Furthermore, if required, the supply of refrigerant to the cooling stations may be interrupted until the refrigerant is supercooled to a desired temperature in the receiving space of the refrigerant container and/or the liquefier.

The coolant in the liquid state of aggregation may be supplied continuously or batchwise to the heat exchanger arranged in the receiving space of the refrigerant container and/or to the at least one cooling station. Excess refrigerant not required in the cooling stations and/or in the heat exchanger arranged in the receiving space of the refrigerant container may optionally be directed as a bypass into the receiving space of the refrigerant container. This ensures a permanent supercooling of the refrigerant in the receiving space of the refrigerant container.

Similarly, the refrigerant which is at least partially converted from the liquid to the gaseous state of aggregation on releasing its cooling energy to the at least one cooling station may be supplied continuously or batchwise to the receiving space of the refrigerant container. The batchwise supply of the gaseous refrigerant into the receiving space of the refrigerant container makes it possible to avoid liquid accumulations in the pipelines connecting the cooling stations to the receiving space of the refrigerant container.

On stopping the cooling system, refrigerant in the liquid state of aggregation may be directed from the at least one cooling station into the liquefier and supercooled by heat energy transfer to a refrigerant flowing through a heat exchanger of the liquefier. Subsequently, the refrigerant may be directed into the receiving space of the refrigerant container.

Furthermore, on stopping the cooling system, refrigerant in the gaseous state of aggregation may be directed from the at least one cooling station and/or the heat exchanger arranged in the receiving space of the refrigerant container into the receiving space of the refrigerant container and/or the liquefier, in order to be converted to the liquid state of aggregation again by heat energy transfer to the refrigerant flowing through the heat exchanger arranged in the receiving space of the refrigerant container and/or a refrigerant flowing through a heat exchanger of the liquefier. The liquefaction of the refrigerant causes the pressure in the cooling system to fall, so that liquid accumulations present in the system evaporate. The refrigerant evaporated here may be liquefied in the receiving space of the refrigerant container and/or the liquefier. Preferably, the liquefied refrigerant is supercooled in the receiving space of the refrigerant container and/or the liquefier. This can be achieved by at least partial flooding of the receiving space of the refrigerant container and/or the liquefier.

On stopping the cooling system, the receiving space of the refrigerant container may be hermetically shut off from the cooling circuit and the further components of the cooling system as soon as the refrigerant circulating in the cooling circuit has been directed substantially into the receiving space of the refrigerant container and in particular the pressure of the refrigerant in the cooling circuit and/or further components of the cooling system has fallen below a predetermined threshold value. Preferably, the receiving space is large enough hold the total amount of refrigerant which, during operation of a cooling system equipped with the refrigerant container, circulates in the cooling circuit of the cooling system. Furthermore, the receiving space of the refrigerant container is preferably designed such that it is able to reliably hold a total amount of refrigerant, to be held in the receiving space, even if the refrigerant is completely in the gaseous state of aggregation. The receiving space or an enclosure surrounding the receiving space must then be designed such that it can withstand the pressure of the refrigerant in the gaseous state of aggregation without being damaged. The refrigerant container is thus usable as a high-pressure collector for the refrigerant circulating in the circuit of the cooling system during operation of the cooling system.

If the receiving space of the refrigerant container is hermetically shut of from the cooling circuit and the further components of the cooling system, it is possible to effectively prevent that, in the rest state of the cooling system, when the refrigerant, which circulates in the cooling circuit of the cooling system during operation of the cooling system, and which is held in the receiving space of the refrigerant container, evaporates owing to high ambient temperatures, the cooling circuit and/or further components of the cooling system are subjected to the high maximum rest pressure of the refrigerant. Instead, regions of the cooling circuit lying outside the refrigerant container can be maintained under a comparatively low operating pressure.

The mechanical loads to which the line system and other components of the cooling system are subjected can thereby be markedly reduced. A design of these components adapted to the reduced mechanical loads therefore enables weight and volume reductions which have a beneficial effect particularly when the cooling system is used on hoard an aircraft and result in a reduction of the manufacturing and operating costs. Moreover, a cooling system is distinguished by increased operating reliability and reduced leakage susceptibility owing to the reduced pressure prevailing in wide regions of the cooling circuit in the rest state of the cooling system. Finally, assembly and maintenance work is simplified.

BRIEF DESCRIPTION OF THE DRAWINGS

Preferred embodiments of the invention will now be explained in more detail with reference to the appended, schematic drawings, of which

DETAILED DESCRIPTION

Figure 1:
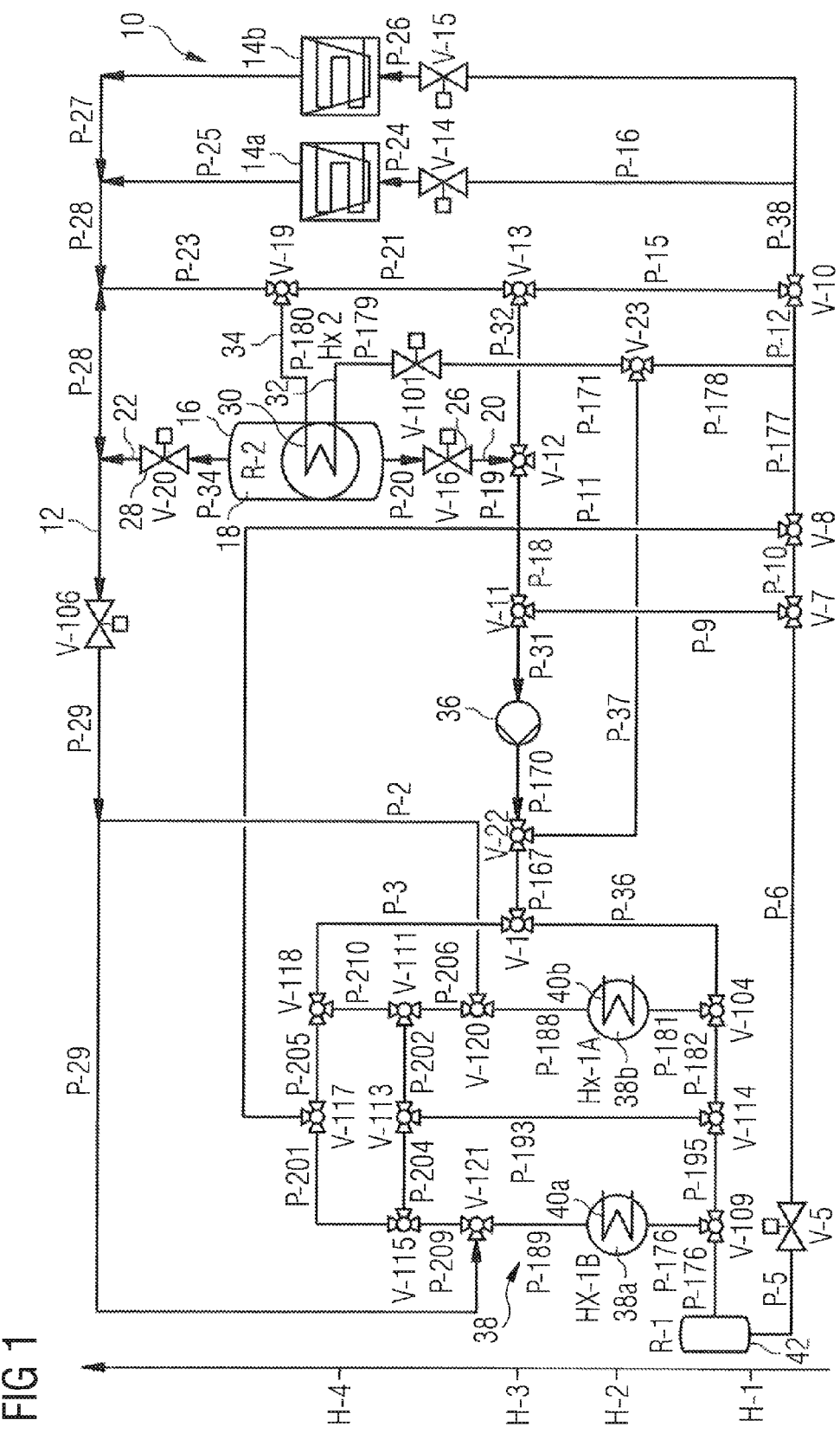
FIG. 1 shows a first embodiment of a cooling system suitable for use in an aircraft.

FIG. 1 shows a first embodiment of a cooling system 10 which is suitable in particular for cooling food on hoard an aircraft. The cooling system 10 comprises a cooling circuit 12, in which two cooling stations 14a and 14b operable as evaporators are arranged. A two-phase refrigerant, for example $CO_2$ or R134A, circulates in the cooling circuit 12. The cooling system 10 further comprises a refrigerant container 16 which comprises a receiving space 18 arranged in an interior space of the refrigerant container. The receiving space 18 of the refrigerant container 16 is designed such that it can hold the total amount of refrigerant circulating in the cooling circuit 12 during operation of the cooling system 10, even if the refrigerant, for example in the rest state of the cooling system 10, is in the gaseous state of aggregation. The receiving space 18 is consequently designed such that it can withstand the pressure of the refrigerant in the gaseous state of aggregation without being damaged. The refrigerant container 15 is thus usable as a high-pressure collector for the refrigerant circulating in the cooling circuit 12 during operation of the cooling system 10.

The receiving space 18 of the refrigerant container 16 is connected to the cooling circuit 12 by receiving space lines 20, 22. The receiving space line 22 is connected to the receiving space 18 in an upper region of the refrigerant container 16. By contrast, the receiving space line 20 is connected to a sump of the receiving space 18. Refrigerant can be supplied to the receiving space 18 of the refrigerant container 15 and/or refrigerant can be discharged from the receiving space 18 of the refrigerant container 16 through the receiving space lines 20, 22.

In the receiving space line 20 is arranged a valve 26 for controlling the flow of the refrigerant through the receiving space line 20. Furthermore, in the receiving space line 22 is arranged a valve 28 for controlling the flow of the refrigerant through the receiving space line 22. The valves 26, 28 are also suitable for controlling the pressure of the refrigerant flowing through the receiving space lines 20, 22. In particular, however, the valves 26, 28 serve to disconnect the refrigerant container 16 or the receiving space 18 of the refrigerant container 16 from the cooling circuit 12. It is thereby possible to effectively prevent the cooling circuit 12 and further components of the cooling system 10 arranged in the cooling circuit from being subjected to high pressure, in operating phases of the cooling system 10 in which the refrigerant circulating in the cooling circuit 12 during normal operation of the cooling system 10 is held in the receiving space 18 of the refrigerant container 15 in the gaseous state of aggregation.

A heat exchanger 30 is arranged in the receiving space 18 of the refrigerant container 16. The heat exchanger 30 is connected to a first heat exchanger line 32 for supplying refrigerant into the heat exchanger 30 and to a second heat exchanger line 34 for discharging refrigerant from the heat exchanger 30. The cooling system 34 further comprises a conveying device 36 configured in the form of a pump, which is adapted to convey refrigerant, present substantially in the liquid state of aggregation, through the cooling circuit 12.

Furthermore, there is provided a liquefier 38 which comprises a first and a second liquefier unit 38a, 38b. Each liquefier unit 38a, 38b comprises a heat exchanger 40a, 40b which is arranged in its interior space and through which a further refrigerant flows. The further refrigerant can be cooled to a desired low temperature, for example by a separately formed refrigerating device, before it is supplied into the liquefier units 38a, 38b. A liquid refrigerant, but also a two-phase refrigerant, in particular $CO_2$ or R134A, can be used as the further refrigerant. Finally, a reservoir 42 is arranged in the cooling circuit 12.

Alongside the cooling system 10 in FIG. 1 can be seen a qualitative height scale 55, which gives an indication of the height at which the components of the cooling system 10 are located when the cooling system 10 is installed in the aircraft. H-1 represents a low height, H-2 and H-3 represent a medium height and H-4 represents a great height above a lowest point of the underside of the aircraft.

The functioning and operation of the cooling system 10 are explained in more detail below.

In the rest state of the cooling system 10, most of the refrigerant circulating in the cooling circuit during operation of the system 10 is held in the receiving space 18 of the refrigerant container 16. The refrigerant in the receiving space 18 of the refrigerant container 16 is in the liquid state, in the gaseous state or in a supercritical state, depending on the ambient temperature. It is assumed below that the refrigerant held in the receiving space 18 of the refrigerant container 16 is in the gaseous state of aggregation. The valves 26, 28 arranged in the receiving space lines 20, 22 are closed, so that the receiving space 18 of the refrigerant container 16 is hermetically shut off. However, small amounts of gaseous refrigerant are also still stored in the pipelines of the cooling circuit 12 and the cooling system components arranged in the cooling circuit 12.

To start the cooling system 10, firstly the liquefier 38 is put into operation and the gaseous refrigerant stored in the pipelines of the cooling circuit 12 and the cooling system components arranged in the cooling circuit 12 is converted to the liquid state of aggregation in the liquefier 38. As a result, the pressure in the cooling circuit 12 and the further components of the cooling system 10 falls. The refrigerant liquefied by the liquefier 38 is supplied to the reservoir 42. If desired, the refrigerant may be supercooled before being supplied into the reservoir 42 or in the reservoir 42. This can be achieved by flooding the liquefier 38, or the liquefier unit 38a used to liquefy the refrigerant, at least partially with the liquid refrigerant to be directed off into the reservoir 42, so that heat energy stored in the liquid refrigerant can be transferred to the further refrigerant flowing through the heat exchanger 40a of the liquefier unit 38a. Alternatively or additionally to this, the reservoir can also be connected via a recirculation line to one of the liquefier units 38a, 38b or both liquefier units 38a, 38b, so that refrigerant can be recirculated from the reservoir 42 into the liquefier unit(s) 38a, 38b and supercooled there. Finally, it is conceivable to supply cold energy from an external refrigerating device to the reservoir 42 for the supercooling of the refrigerant stored in the reservoir 42. In this operating phase of the system 10, the valves 26, 28 arranged in the receiving space lines 20, 22 remain closed.

As soon as the pressure in the cooling system 10 falls below a predetermined threshold value, the valve 28 arranged in the receiving space line 22 is opened and a partial amount of the refrigerant in the gaseous state of aggregation is discharged from the receiving space 18 of the refrigerant container 16 into the cooling circuit 12 in a manner driven by differential pressure. On flowing through the cooling circuit 12 and further components of the cooling system 10, the partial amount of the refrigerant discharged from the receiving space 18 of the refrigerant container 16 into the cooling circuit 12 expands and thereby ensures a cooling of the cooling circuit 12 and further components of the cooling system 10. The system pressure rises.

The partial amount of the refrigerant discharged from the receiving space 18 of the refrigerant container 16 into the cooling circuit 12 of the cooling system 10 is controlled by the valve 28 in dependence on the pressure of the refrigerant in the cooling circuit 12 and further components of the cooling system 10. Furthermore, on the control of the partial amount of the refrigerant discharged from the receiving space 18 of the refrigerant container 16 into the cooling circuit 12 of the cooling system 10, the maximum pressure loadability of the cooling circuit 12 and further components of the cooling system 10 is taken into account. The low the pressure of the refrigerant in the cooling circuit 12 and the further components of the cooling system 10 and/or the higher the pressure loadability for which the cooling circuit 12 and the further components of the cooling system 10 are designed, the greater the partial amount of the refrigerant discharged from the receiving space 18 of the refrigerant container 16 into the cooling circuit 12 of the cooling system 10 can be.

The refrigerant, which, in the rest state of the cooling system 10, is stored in the cooling circuit 12 and further components of the cooling system 10 in the gaseous state of aggregation and after its liquefaction in the liquefier 38 is temporarily stored in the storage reservoir 42, is directed in the direction of the conveying device 36 arranged downstream of the storage reservoir 42 in the cooling circuit 12 owing to the pressure rise in the cooling circuit 12 and consequently the storage reservoir 42, which is caused by the discharge of the partial amount of the refrigerant in the gaseous state of aggregation from the receiving space 18 of the refrigerant container 16 into the cooling circuit 12.

Owing to the pressure-driven supply of liquid refrigerant in the direction of the conveying device 36, the volume of any refrigerant gas still present in a pipeline upstream of the conveying device 36 is reduced. Ideally, the conveying device 36 is even completely flooded. This prevents gaseous refrigerant or refrigerant present as wet steam from having to be conveyed by the conveying device 36 suitable for conveying liquid refrigerant, and thereby resulting in flow separations or even damage of the conveying device. If necessary, in this operating phase of the cooling system 10, further regions of the cooling circuit 12 or further components of the cooling system 10 can be opened for the supply of gaseous refrigerant from the receiving space 18 of the refrigerant container 16, in order to control the pressure in the cooling circuit 12 and the further components of the cooling system 12 as desired.

The partial amount of the refrigerant discharged from the receiving space 18 of the refrigerant container 16 into the cooling circuit 12 of the cooling system 10 is supplied to the it liquefier 38, in particular to the liquefier unit 38a. The refrigerant is converted to the liquid state of aggregation in the liquefier unit 38a and then directed into the reservoir 42. The refrigerant can be supercooled before being supplied into the reservoir 42 or in the reservoir 42, as described above. In particular, a supercooling of the refrigerant and cold running of a partial region of the cooling circuit is possible by circulating the refrigerant through the liquefier unit 38a, the reservoir 42, the conveying device 36 and the liquefier unit 38b.

The partial amount of the refrigerant liquefied by the liquefier 38 and optionally temporarily stored in the reservoir 42 is directed, in the next step, through the heat exchanger 30 arranged in the receiving space 18 of the refrigerant container 16. For this purpose, the refrigerant is conveyed into the heat exchanger line 32 by means of the conveying device 36. On flowing through the heat exchanger 30, the refrigerant releases its cooling energy to the refrigerant stored in the receiving space 18 of the refrigerant container 16 in the gaseous state of aggregation. The refrigerant stored in the receiving space 18 of the refrigerant container 16 in the gaseous state of aggregation is thereby converted to the liquid state of aggregation.

In contrast to this, the refrigerant flowing through the heat exchanger 30 evaporates and is returned via the heat exchanger line 34 and the cooling circuit 12 into the liquefier 38. In principle, it is possible to lead the refrigerant, discharged from the heat exchanger 30 via the heat exchanger line 34, to the liquefier unit 38a and liquefy it in the liquefier unit 38a. The refrigerant can be supplied to the reservoir 42 from the liquefier unit 38a. The conveying device 36 can lead the refrigerant from the reservoir 42 through the liquefier unit 38b for supercooling and subsequently convey it into the heat exchanger 30 again via the heat exchanger line 32. Alternatively to this, the refrigerant discharged from the heat exchanger 30 via the heat exchanger line 34 can also be supplied, in parallel, to the liquefier unit 38a and to the liquefier unit 38b for quick and efficient liquefaction. The conveying device 36 then conveys the refrigerant hack into the heat exchanger 30 again directly via the heat exchanger line 32.

The pressure in the cooling circuit 12 and further components of the cooling system 10 is controlled in this operating phase by appropriately controlling the refrigerant volume flow to the heat exchanger 30 arranged in the receiving space 18 of the refrigerant container 16. Alternatively or additionally to this, the pressure in the cooling circuit 12 and further components of the cooling system can be controlled by increasing the liquefaction capacity of the liquefier 38 for liquefying the refrigerant converted into the gaseous state of aggregation again on flowing through the heat exchanger 30 arranged in the receiving space 18 of the refrigerant container 16, for example by the above-described parallel connection of the liquefier units 38a, 38b.

After the conversion of the entire refrigerant, stored, in the rest state of the cooling system 10, in the receiving space 18 of the refrigerant container 16, in the cooling circuit 12 and further components of the cooling system 10 in the gaseous state of aggregation, to the liquid state of aggregation, the refrigerant in the liquid state of aggregation is circulated through the heat exchanger 30 arranged in the receiving space 18 of the refrigerant container 16, the receiving space 18 of the refrigerant container 16 and the liquefier 38 for supercooling. In other words, after flowing through the heat exchanger 30 arranged in the receiving space 18 of the refrigerant container 16, the liquid refrigerant is not discharged from the refrigerant container 16 via the heat exchanger line 34, but is directed into the receiving space 18 of the refrigerant container 16.

The refrigerant is then recirculated from the receiving space 18 of the refrigerant container 16 into the liquefier 38, before the refrigerant is once again supplied to the heat exchanger arranged in the receiving space 18 of the refrigerant container 16. In this operating state, the storage reservoir 42 is completely emptied, i.e. the entire refrigerant present in the cooling system 10 is included in the supercooling circuit to ensure a uniform supercooling of the refrigerant. The refrigerant can in this case flow through the liquefier units 38a, 38b in series or parallel to one another.

During normal operation of the cooling system 10, refrigerant in the liquid state of aggregation is supplied to at least one of the cooling stations 14a, 14b. The refrigerant, which is at least partially converted to the gaseous state of aggregation on releasing its cooling energy to a cooling station 14a, 14b, is directed into the receiving space 18 of the refrigerant container 16, in order to be converted into the liquid state of aggregation again by heat energy transfer to the refrigerant flowing through the heat exchanger 30 arranged in the receiving space 18 of the refrigerant container 16. During normal operation of the cooling system 10, the refrigerant container 16 is thus operated as a liquefier for liquefying the refrigerant converted to the gaseous state of aggregation in the cooling stations 14a, 14b. Alternatively or additionally to this, the refrigerant, which is at least partially converted to the gaseous state of aggregation on releasing its cooling energy to a cooling station 14a, 14b, can also be directed into the liquefier 38, in order to be converted to the liquid state of aggregation again by heat energy transfer to a refrigerant flowing through a heat exchanger 40a, 40b of the liquefier 38.

If desired, the refrigerant can also be supercooled in the receiving space 18 of the refrigerant container 16 and/or the liquefier 38. This can be achieved by at least partially flooding the receiving space 18 of the refrigerant container 16 and/or the liquefier 38 with the liquefied refrigerant. Furthermore, if required, the supply of refrigerant to the cooling stations 14a, 14b can be interrupted until the refrigerant is supercooled to a desired temperature in the receiving space 18 of the refrigerant container 16 and/or the liquefier 38.

The coolant in the liquid state of aggregation can be supplied continuously or batchwise to the heat exchanger 30 arranged in the receiving space 18 of the refrigerant container 16 and/or to the cooling stations 14a, 14b. Excess refrigerant not required in the cooling stations 14a, 14b and/or in the heat exchanger 30 arranged in the receiving space 18 of the refrigerant container 16 can optionally be directed as a bypass into the receiving space 18 of the refrigerant container 16. Similarly, the refrigerant which is at least partially converted from the liquid to the gaseous state of aggregation on releasing its cooling energy to a cooling station 14a, 14b can be supplied continuously or hatchwise to the receiving space 18 of the refrigerant container 16.

On stopping the cooling system 10, refrigerant in the liquid state of aggregation can be directed from the cooling stations 14a, 14b into the liquefier 38 and supercooled by heat energy transfer to a refrigerant flowing through a heat exchanger 40a, 40b of the liquefier 38. Subsequently, the refrigerant can be directed into the receiving space 18 of the refrigerant container 16.

Furthermore, on stopping the cooling system 10, refrigerant in the gaseous state of aggregation can be directed from the cooling stations and/or the heat exchanger 30 arranged in the receiving space 18 of the refrigerant container 16 into the receiving space 18 of the refrigerant container 16 and/or the liquefier 38, in order to be converted into the liquid state of aggregation again by heat energy transfer to the refrigerant flowing through the heat exchanger 30 arranged in the receiving space 18 of the refrigerant container 16 and/or the refrigerant flowing through a heat exchanger 40a, 40b of the liquefier 38.

Finally, the receiving space 18 of the refrigerant container 16 is hermetically shut off from the cooling circuit 12 and the further components of the cooling system 10 as soon as the refrigerant circulating in the cooling circuit 12 has been directed substantially into the receiving space 18 of the refrigerant container 16 and in particular the pressure of the refrigerant in the cooling circuit 12 and/or further components of the cooling system 10 has fallen below a predetermined threshold value.

Figure 2:
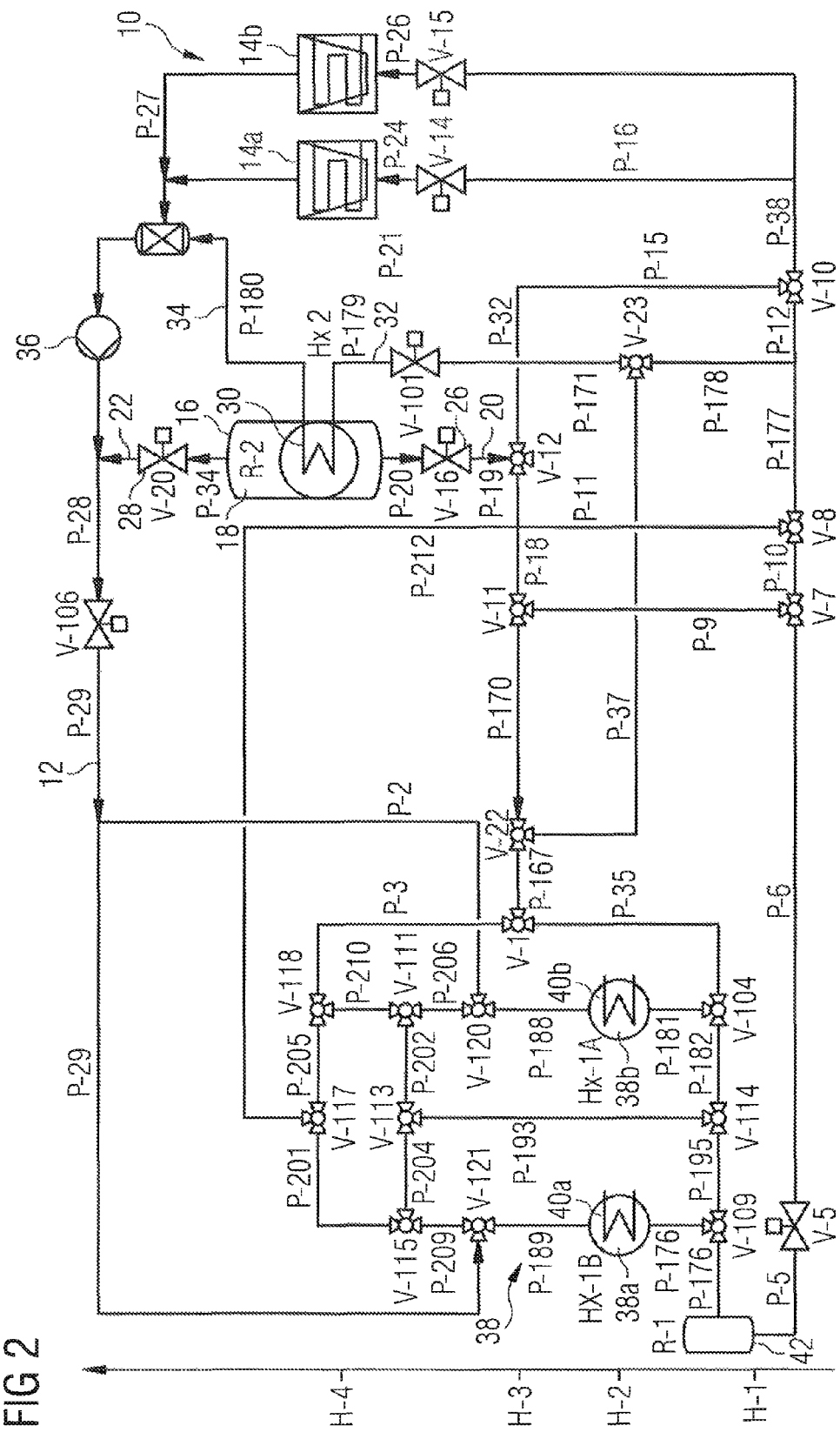
FIG. 2 shows a second embodiment of a cooling system suitable for use in an aircraft.

FIG. 2 shows a second embodiment of a cooling system 10, which differs from the it) first embodiment of the cooling system 10 shown in FIG. 1 in that, instead of a conveying device configured as a pump, a conveying device 36 configured as a compressor performs the conveyance of refrigerant present predominantly in its gaseous phase. The conveying device 36 is arranged in the cooling circuit 12 downstream of the cooling stations 14a, 14b and downstream of a connection point of the heat exchanger line 34 to the cooling circuit 12. The advantage of a conveying device 36 configured as a compressor is that liquid pockets can be more easily evaporated from the cooling circuit 12 in that the refrigerant container 16 is run at low temperatures and warm and compressed gaseous refrigerant flows through the cooling circuit 12. In other respects, the construction and functioning of the cooling system 10 shown in FIG. 2 correspond to the construction and functioning of the arrangement according to FIG. 1.

Figure 3:
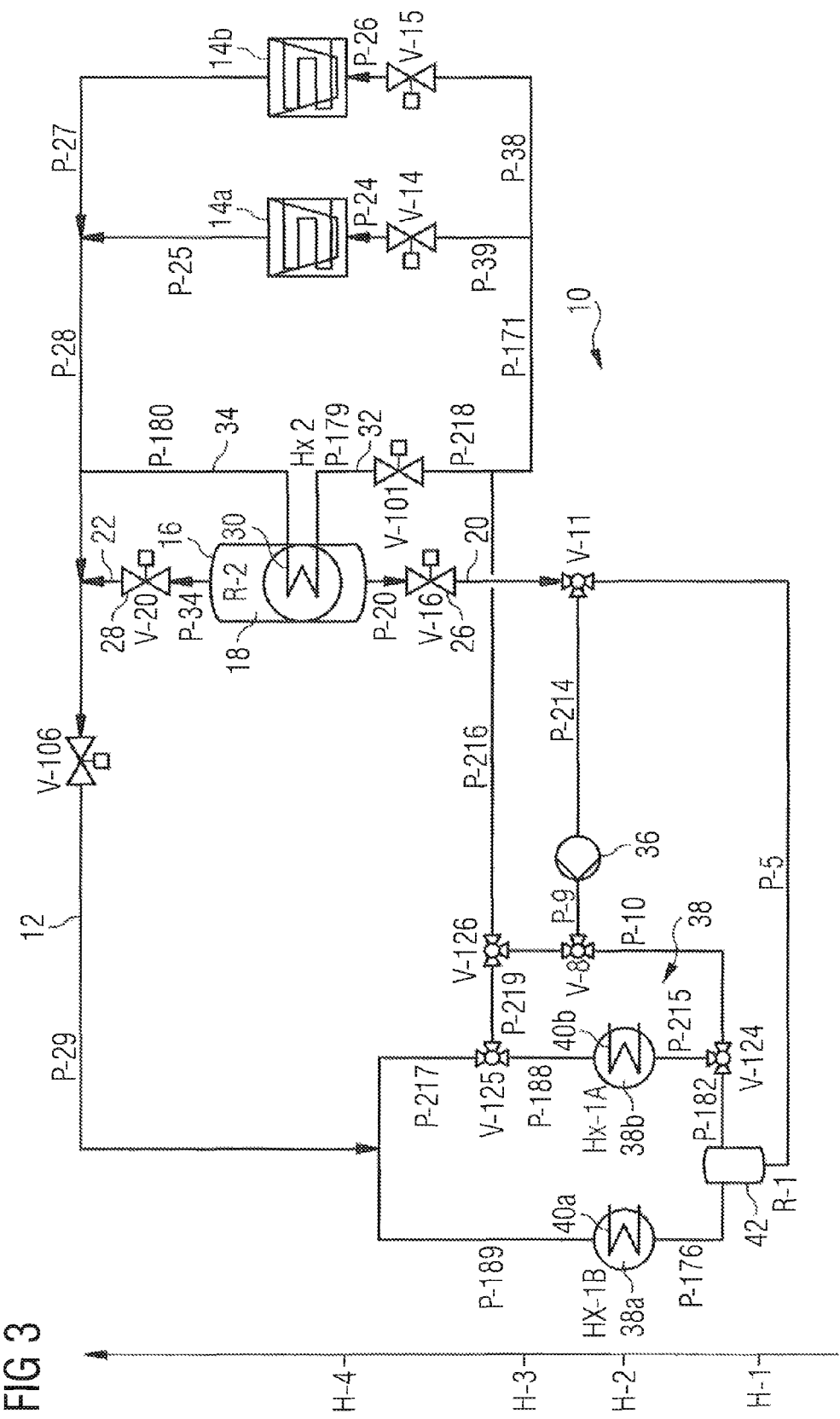
FIG. 3 snows a third embodiment of a cooling system suitable for use in an aircraft.

FIG. 3 shows a third embodiment of a cooling system 10, which differs from the first embodiment of the cooling system 10 shown in FIG. 1 by its simpler design. The functioning of the cooling system 10 sown in FIG. 3 corresponds, however, to the functioning of the arrangement according to FIG. 1.

Figure 4:
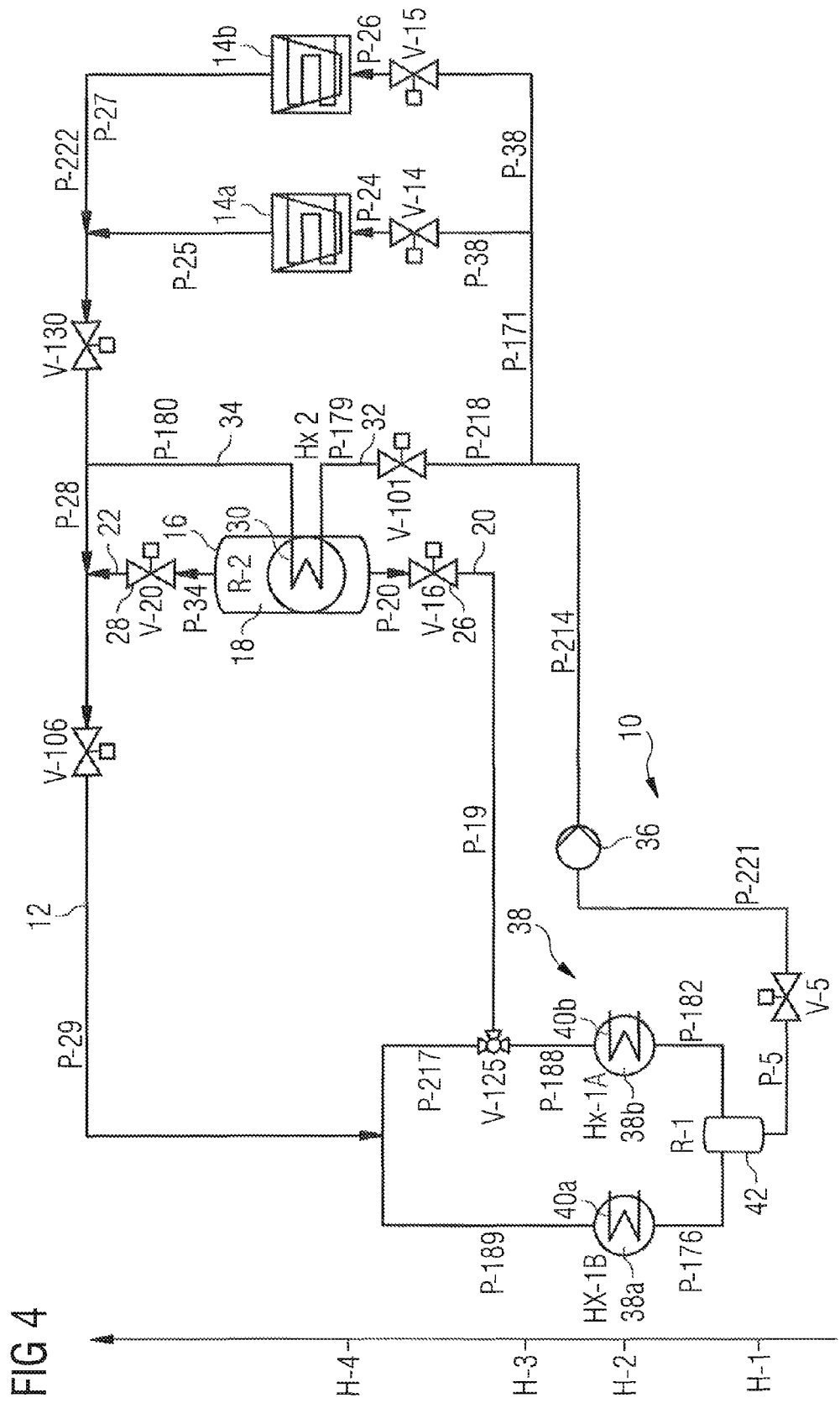
FIG. 4 shows a fourth embodiment of a cooling system suitable for use in an aircraft.

Finally, FIG. 4 shows a still further simplified fourth embodiment of a cooling system 10, in which the receiving space line 20 leads into the liquefier 38 without interposition of the conveying device 36. The conveying device 36 is positioned downstream of the reservoir 42. The functioning of the cooling system 10 shown in FIG. 4 corresponds to the functioning of the arrangement according to FIG. 1.

Features described here in connection with individual embodiments of the cooling system can of course also be realised in other embodiments of the cooling system. Features described in connection with specific embodiments of the cooling system are consequently transferable in any combination to other embodiments of the cooling system.

What is claimed is:

1. A method for operating a cooling system suitable for cooling food on board an aircraft, comprising:

discharging, upon starting the cooling system, a partial amount of a refrigerant, which, in a rest state of the cooling system, is stored in a receiving space of a refrigerant container in a gaseous state of aggregation, from the receiving space of the refrigerant container into a cooling circuit of the cooling system;

directing the partial amount of the refrigerant into a liquefier arranged in the cooling circuit and converting the partial amount of the refrigerant to a liquid state of aggregation;

directing the partial amount of the refrigerant liquefied by the liquefier through a heat exchanger arranged in the receiving space of the refrigerant container; and converting remaining refrigerant, stored in the receiving space of the refrigerant container in the gaseous state of aggregation, to the liquid state of aggregation by heat energy transfer to the partial amount of the refrigerant flowing through the heat exchanger.

2. The method according to claim 1, wherein the partial amount of the refrigerant discharged from the receiving space of the refrigerant container into the cooling circuit is discharged from the receiving space of the refrigerant container into the cooling circuit in a manner driven by differential pressure, expands on flowing through at least one of the cooling circuit and further components of the cooling system and thereby ensures cooling of at least one of the cooling circuit and further components of the cooling system.

3. The method according to claim 1, wherein the partial amount of the refrigerant discharged from the receiving space of the refrigerant container into the cooling circuit of the cooling system is controlled based on the pressure of the refrigerant in at least one of the cooling circuit and further components of the cooling system.

4. The method according to claim 1, wherein the partial amount of the refrigerant discharged from the receiving space of the refrigerant container into the cooling circuit of the cooling system is controlled based on the maximum pressure loadability of at least one of the cooling circuit and further components of the cooling system.

5. The method according to claim 1, wherein, before the partial amount of the refrigerant in the gaseous state of aggregation is discharged from the receiving space of the refrigerant container into the cooling circuit, refrigerant, which, in a rest state of the cooling system, is stored in at least one of the cooling circuit and further components of the cooling system in the gaseous state of aggregation, is directed into the liquefier and converted to the liquid state of aggregation.

6. The method according to claim 1, wherein the refrigerant liquefied by the liquefier is temporarily stored and subcooled in a storage reservoir.

7. The method according to claim 6, wherein the refrigerant, which, in the rest state of the cooling system, is stored in at least one of the cooling circuit and further components of the cooling system in the gaseous state of aggregation and after its liquefaction in the liquefier is temporarily stored in the storage reservoir, is directed in the direction of a conveying device arranged downstream of the storage reservoir in the cooling circuit by a pressure rise in at least one of the cooling circuit and the storage reservoir caused by discharging the partial amount of the refrigerant in the gaseous state of aggregation from the receiving space of the refrigerant container into the cooling circuit and/or a pressure increase in the cooling system.

8. The method according to claim 1, wherein the refrigerant directed through the heat exchanger arranged in the receiving space of the refrigerant container is converted, on flowing through the heat exchanger, by cooling energy transfer to the remaining refrigerant stored in the receiving space of the refrigerant container in the gaseous state of aggregation, to the gaseous state of aggregation again and after flowing through the heat exchanger is supplied to the liquefier again.

9. The method according to claim 1, wherein the pressure in at least one of the cooling circuit and further components of the cooling system is controlled by at least one of
   (i) appropriately controlling a refrigerant volume flow to the heat exchanger arranged in the receiving space of the refrigerant container and
   (ii) increasing the liquefaction capacity of the liquefier for liquefying the refrigerant converted to the gaseous state of aggregation again on flowing through the heat exchanger arranged in the receiving space of the refrigerant container.

10. The method according to claim 1, wherein after the conversion of the refrigerant, stored, in the rest state of the cooling system, in the receiving space of the refrigerant container, in at least one of the cooling circuit and further components of the cooling system in the gaseous state of aggregation, to the liquid state, the refrigerant in the liquid state is circulated through the heat exchanger arranged in the receiving space of the refrigerant container, the receiving space of the refrigerant container and the liquefier for subcooling.

11. The method according to claim 1, wherein the refrigerant in the liquid state of aggregation during normal operation of the cooling system is supplied to at least one cooling station, the refrigerant being converted at least partially from the liquid to the gaseous state of aggregation on releasing its cooling energy to the at least one cooling station, and the refrigerant converted at least partially to the gaseous state of aggregation on releasing its cooling energy to the at least one cooling station is directed into at least one of the receiving space of the refrigerant container and the liquefier, in order to be converted to the liquid state of aggregation again by heat energy transfer to at least one of the refrigerant flowing through the heat exchanger arranged in the receiving space of the refrigerant container and a refrigerant flowing through a heat exchanger of the liquefier.

12. The method according to claim 11, wherein the refrigerant in the liquid state of aggregation is supplied continuously to at least one of the heat exchanger arranged in the receiving space of the refrigerant container and to the at least one cooling station.

13. The method according to claim 11, wherein the refrigerant in the liquid state of aggregation is supplied batchwise to at least one of the heat exchanger arranged in the receiving space of the refrigerant container and to the at least one cooling station.

14. The method according to claim 11, wherein the refrigerant converted at least partially from the liquid to the gaseous state of aggregation on releasing its cooling energy to the at least one cooling station is supplied continuously or batchwise to the receiving space of the refrigerant container.

15. The method according to claim 1, wherein, on stopping the cooling system, refrigerant in the liquid state of aggregation is directed from at least one cooling station into the liquefier and subcooled by heat energy transfer to a refrigerant flowing through a heat exchanger of the liquefier, before it is directed into the receiving space of the refrigerant container.

16. The method according to claim 1, wherein, on stopping the cooling system, refrigerant in the gaseous state of aggregation is directed from at least one cooling station and the heat exchanger arranged in the receiving space of the refrigerant container into at least one of the receiving space of the refrigerant container and the liquefier, in order to be converted to the liquid state again by heat energy transfer to at least one of the refrigerant flowing through the heat exchanger arranged in the receiving space of the refrigerant container and a refrigerant flowing through a heat exchanger of the liquefier, the liquefied refrigerant preferably being subcooled.

17. The method according to claim 1, wherein, on stopping the cooling system, the receiving space of the refrigerant container is hermetically shut off from the cooling circuit and the further components of the cooling system as soon as the refrigerant circulating in the cooling circuit has been directed substantially into the receiving space of the refrigerant container and in particular the pressure of the refrigerant in at least one of the cooling circuit and further components of the cooling system has fallen below a predetermined threshold value.

* * * * *